(12) United States Patent
Demant et al.

(10) Patent No.: US 8,544,027 B2
(45) Date of Patent: Sep. 24, 2013

(54) LOGICAL DATA MODEL ABSTRACTION IN A PHYSICALLY DISTRIBUTED ENVIRONMENT

(75) Inventors: Hilmar Demant, Karlsdorf (DE); Sebastian Droll, Heidelberg (DE); Joachim Fitzer, Schriesheim (DE); Ioannis Grammatikakis, Maxdorf (DE); Jan Heiler, Walldorf (DE); Juergen Sattler, Wiesloch (DE); Frank Schertel, Mannheim (DE); Markus Viol, Walldorf (DE); Thorsten Weber, Mannheim (DE)

(73) Assignee: SAP AG, Walldorf (DE)

(*) Notice: Subject to any disclaimer, the term of this patent is extended or adjusted under 35 U.S.C. 154(b) by 270 days.

(21) Appl. No.: 12/847,257

(22) Filed: Jul. 30, 2010

(65) Prior Publication Data
US 2012/0030591 A1   Feb. 2, 2012

(51) Int. Cl.
*G06F 3/00* (2006.01)
*G06F 15/16* (2006.01)
*G06F 9/44* (2006.01)

(52) U.S. Cl.
USPC ............................ 719/318; 709/203; 717/115

(58) Field of Classification Search
None
See application file for complete search history.

(56) References Cited

U.S. PATENT DOCUMENTS

| | | | |
|---|---|---|---|
| 6,405,367 B1* | 6/2002 | Bryant et al. | 717/115 |
| 2002/0065947 A1* | 5/2002 | Wishoff et al. | 719/318 |
| 2003/0160813 A1* | 8/2003 | Raju | 345/730 |
| 2005/0086344 A1* | 4/2005 | Suesserman | 709/227 |
| 2009/0292999 A1* | 11/2009 | LaBine et al. | 715/740 |
| 2010/0005394 A1* | 1/2010 | Dubnov | 715/733 |
| 2010/0088411 A1* | 4/2010 | Litofsky et al. | 709/224 |
| 2010/0186029 A1* | 7/2010 | Kim et al. | 725/33 |

OTHER PUBLICATIONS

"Context-aware User Interface Framework for Mobile Application", Butter, 2007, pp. 1-6.*
"Generating Web-based User Interfaces for Diagramming Tools", Cao, 2005, pp. 1-10.*
"Coordinating Distributed Objects with Declarative Interfaces", Hewlett Packard, 1996, pp. 1-21.*

* cited by examiner

*Primary Examiner* — Tuan Dao
(74) *Attorney, Agent, or Firm* — Brake Hughes Bellermann LLP

(57) ABSTRACT

A component object binds business driven services to a graphical user interface (GUI). The object includes a data model, view model and controller. The view model graphically presents, and the controller manipulates data used by the object. The controller includes an event handler that respond to events generated within the GUI and binds data used by the object to a data source which can be another component object or a remotely located source. The event handler can call a local script to calculate the value of a data element within the object. The component object can be instantiated on a client, and can be configured to communicate with a corresponding component object on a server. The client and server component objects can exchange only that data that needs to be exchanged to maintain the current state of a user interface in the client computer.

16 Claims, 5 Drawing Sheets

LOGICAL DATA MODEL ABSTRACTION IN A PHYSICALLY DISTRIBUTED ENVIRONMENT

TECHNICAL FIELD

This description relates to client/server based applications, and client based data models for accessing and interfacing with data derived from server based applications.

BACKGROUND

Today, business is often conducted via portable and hand-held computers. Devices such as smart phones, personal digital assistants, tablet based computers and netbooks, to name just a few, have a small physical footprint yet a rich graphical user interface. As such, they are well suited for data presentation and remote business use. While the computing power of such devices is considerable, it nonetheless pales in comparison to the computing power of a server or server farm. The same can be said of desktop and laptop computers. While such computers provide rich graphical user interfaces and posses considerable computing power in their own right, absolute computing power pales in comparison to the computing power of a server or server farm. As a result, many computationally intensive applications are most effectively run on servers or server farms. Still, it is often convenient to remotely access the data that is output by such computationally intensive applications on small footprint, hand-held devices or on simple desktop or laptop computers. For example, a salesperson can benefit from having instant access to all of the sales records of his or her customers, including detailed records of orders placed, shipments made, invoices sent, and payments received over a period of several years. Depending on the number and size of the customers, such records can be voluminous, and maintaining and analyzing them can be a computationally intensive task that is best left to an enterprise server or server farm. Nonetheless, the salesperson may benefit from having instant access to and the ability to mine the sales information to address issues that may arise during a sales call or while working on his or her desktop preparing to make a sales call. Moreover, the enterprise can benefit by allowing the salesperson to have write access to the sales records from any remote computer, thereby allowing the sales person to enter new or useful sales information such as the name and contact information of a customer's new purchasing agent.

Achieving both of these goals, i.e., running data intensive applications on server farms where they are most efficiently run while providing access to the output of these applications on remote devices like laptops, desktops or smart phones where they may most urgently be needed, can be accomplished using a client-server computing paradigm. In this paradigm, a client application running on a remote device can interface with and control a server application running on an enterprise server or server farm. The client based application can send commands and data to the server, while the server can execute the commands and return requested or updated data to the client. Often, the structure of the data that is manipulated and handled by the client application is particularized to the data model that is used in the server application. As a result, different clients or client components are needed to access and manipulate data generated in different server applications. This not only increases the burden placed on the client side devices, which need different clients or client components to interface with different server applications, but also increases the burden on the server, which needs to maintain different interfaces for the different clients or client components.

SUMMARY

This document describes methods and apparatus to declaratively bind business driven services to a user interface and to manipulate the data to fit the UI experience.

In one aspect, a component object that declaratively binds business driver services to a graphical user interface is disclosed. The component object includes a data structure that is stored in a memory element. The data structure includes a data model for representing data used by the component object, a view model for graphically presenting the data used by the component object, and a controller for manipulating the data used by the component object.

Features of the invention include one or more of the following. The controller can include an event handler to respond to events generated within the graphical user interface. The event handler can bind data used by the component object to a data source. The data source can be remotely located on a server computer or can be located in a second component object located on the same computer. The component object's data model can include a flag that indicates when the data binding between the component and the data source is valid. The component object's event handler can respond to an event within the graphical user interface by calling a local script to calculate the value of a data element within the component object. The component object's data model can include a flag that indicates when the value of a component object data element has changed. The component object can be instantiated on a client computer, and can be configured to communicate with a corresponding component object that is instantiated on a server computer. The client instantiated component object and the server instantiated component object can exchange data. The data exchanged between the client instantiated component object and the server instantiated component object can be limited to data that needs to be exchanged to maintain the current state of a user interface in the client computer.

Other features of the invention include one or more of the following. A bound property framework allows the client runtime to receive event notifications of changes that are made to data fields that are not in the current scope, focus, or lead selection of the user interface. As a general rule, component objects are only populated in the client runtime if they are within the current scope or focus of the user interface. As a result, changes made to the values of data fields that are out of the current scope, focus or lead selection of the user interface are generally not visible to the client runtime. The bound property framework allows a proxy object to be created within the client runtime, having a logical path to a data field within the data model, which is alerted to changes in the data field regardless of whether the data field is within the current focus, scope or lead selection of the user interface or client runtime.

DETAILED DESCRIPTION

Figure 1:
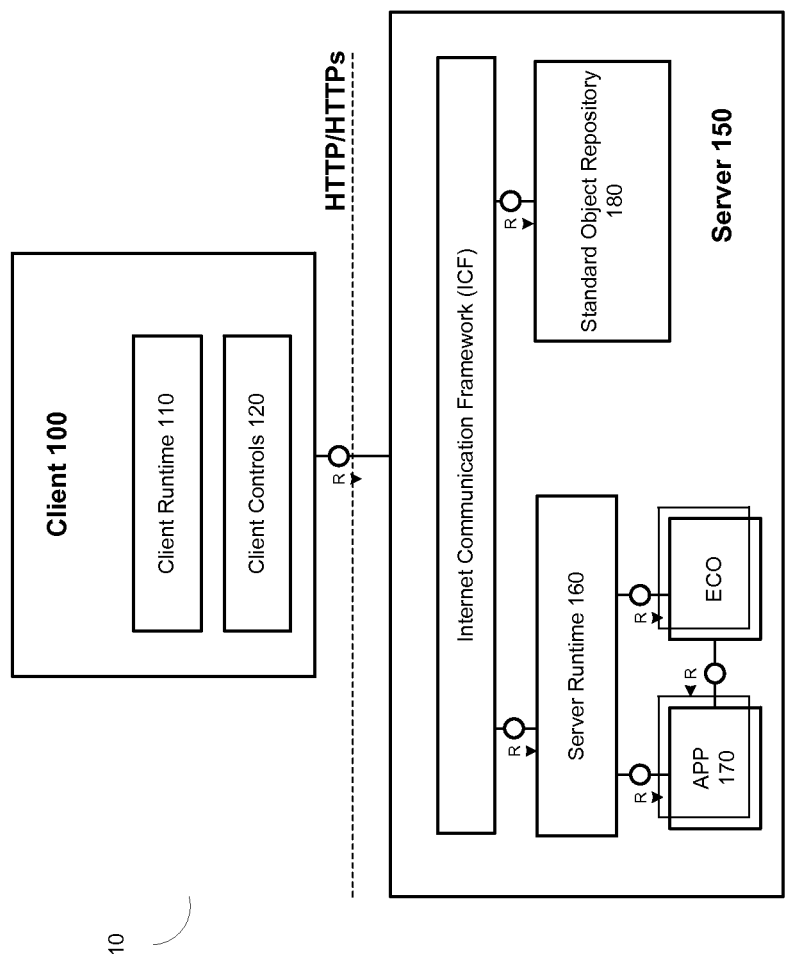
FIG. 1 is a block diagram of a system, including client and server computers, for executing an application using a client-server architecture.

FIG. 1 is a block diagram of a system 10 for executing an application using a client-server architecture. As shown in FIG. 1, system 10 includes a client computer 100 and a server computer 150. The client computer 100 runs a client runtime 110 that includes one or more controls 120. The server computer 150 runs a server runtime 160 and a backend application 170. The client runtime 110 generates and renders a graphical user interface (GUI) that allows a user of client computer 100 to graphically interact with and control the backend application 170 on server 150. The server runtime 160 communicates with both the client runtime 110 on client computer 100 and the backend application 170 on server 150. The server runtime 160 reads, writes, interprets, and translates data from backend application 170 into one or more declared UI component objects (see, FIG. 2) using a data model that is common to both the client runtime 110 and the server runtime 160. Preferably, the client runtime 110 is implemented as a browser plug-in, and executed as part of a browser running on client computer 100. Alternatively, a standalone client runtime (not shown) can be separately compiled, installed, and run independently of any browser running on client computer 100. Preferably, client runtime 110 and server runtime 160 communicate via hyper text transport protocol (HTTP), and exchange data using Java Script Object Notation (JSON). In other embodiments, client runtime 110 and server runtime 160 can communicate via secure HTTP (HTTP/s), and can exchange data using XML. Further details of client runtime 110 and server runtime 160 are provided below.

Figure 2:
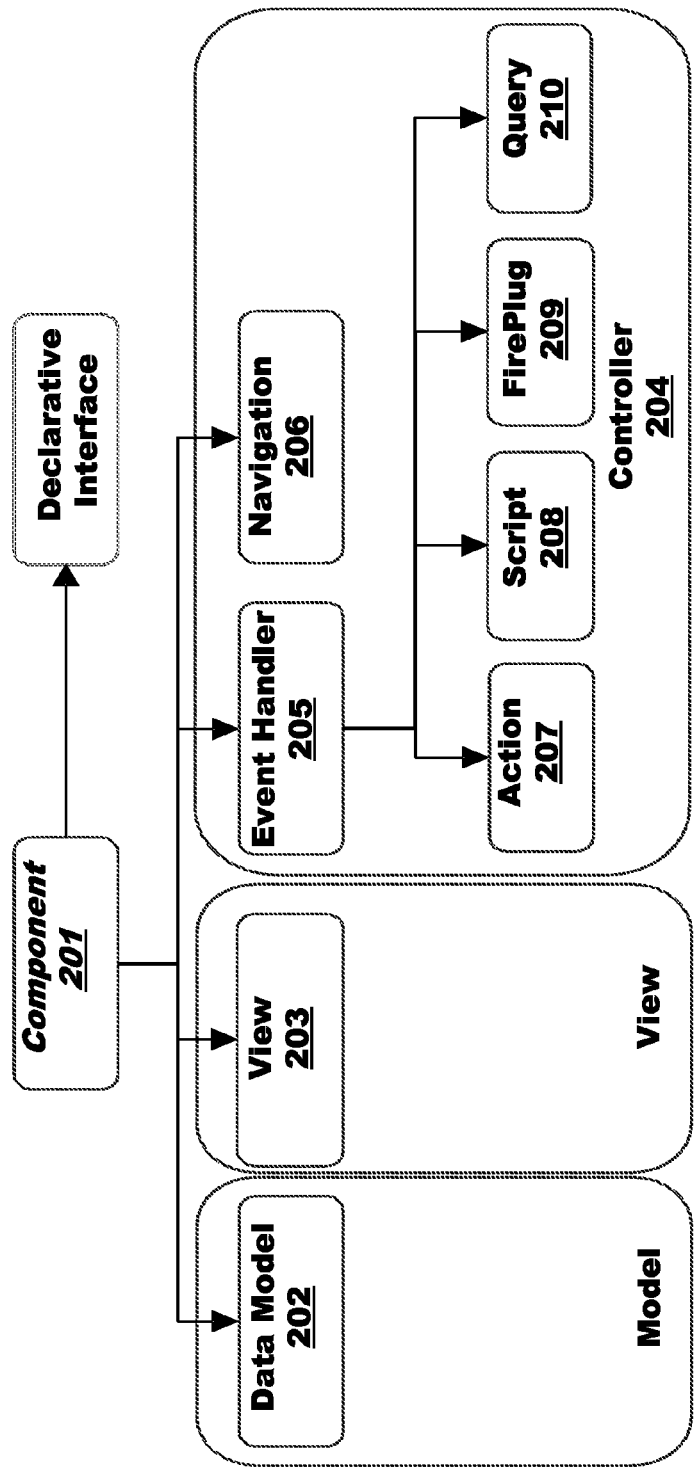
FIG. 2 is a schematic illustration of a declared UI component object.

FIG. 2 is a schematic illustration of a declared UI component object. UI component object 201 includes a data model 202, a view 203, and a controller 204. The data model 202 defines a more universal data structure that is abstracted from the particular data and logic of the backend application 170. The view 203 describes the representation of the component object 201 and data from the data model 202 in a graphical user interface on the client computer 100. Through the UI component's view, event-handlers can be triggered when a user interacts with the component object. The controller 204 provides various means for handling and manipulating the data that is defined in the data model 202 of the component object 201. In particular, the controller 204 includes one or more event handlers 205 and one or more navigation paths 206. The event handlers 205 interpret events that occur within the client runtime 110 or server runtime 160, and bind data fields in the component object 201 to data sources (e.g., backend application 170) per the data model 202. The event handlers 205 can bind data fields to data sources through actions 207 (e.g., calling a function in application 170), scripts 208, or queries 210 (e.g., querying the data source). Finally, the navigation paths 206 describe the mapping of operations and the flow of data between the component object 201 and other component objects in the client runtime 110, particularly when data in one component object depends on data in another component object. For example, if data in a component object 250 (not shown) depends on data in component object 201, controller 204 can include a navigation path 206 that connects component objects 201 and 250. Controller 204 can use the navigation path 206 to notify component object 250 when the data in component object 201 changes. Component object 250 can be embedded in component object 201, or component object 250 can be external to component object 201.

Each UI component object 201 is instantiated on both the client computer 100 and the server computer 150. Data in the client and server sides of the component object 201 are synchronized on an as needed basis. Thus, the client runtime 110 and server runtime 160 only exchange data that needs to be exchanged to maintain the current state of the UI and of the component objects 201 in both the client runtime 110 and the server runtime 160. Data fields in the client side of a component object 201 are bound to corresponding data fields on the server side of the component object, while data fields in the server side of the component object 201 are bound to data sources on the server 150 such as the backend application 170.

To improve system performance and preserve bandwidth on the communication channel between the client computer 100 and the server 150, only data that is currently needed or viewable is loaded from the backend application 170. For example, when data is retrieved from application 170 to populate a list object 201 on the client computer 100, the controller 204 for the list object 201 sends the current lead selection and other information from the current view 203 of the list object 201 to the server runtime 160. The server side list object 201 uses this information to query the application 170 for only those items in the list object 201 that are currently viewable in the view 203 of the client side list object 201. Similarly, if the client side list object 201 is a hierarchical list, the client list object 201 does not receive data needed to populate a child list object unless the child list object is the current lead selection of the client side list object 201. Thus, the child list object appears in a collapsed state when it is not the current lead selection in the client side list object 201, and appears in an expanded state when it is the current lead selection in the client side list object 201.

Changes made to data fields that are not in the current scope, focus, or lead selection of the user interface can nonetheless be made available to the client runtime 110 through a bound property framework. This framework allows the client runtime 110 to receive event notifications of changes that are made to out-of-scope or out-of-focus data fields by creating proxy objects having logical paths to the data fields. The client runtime 110 can be alerted to changes in the data fields monitored by the proxy objects regardless of whether the data fields are within the current focus, scope or lead selection of the client runtime 110. For example, a data model can consist of a sales order containing a list of items being sold, which list can contain one or more sub-lists containing details about each of the items on the sales list. If a user wanted to monitor for changes to the detailed sub-list (e.g., so the only items on the list are items that are made of stainless steel), the user could create a proxy object within the client runtime with a logical path such as "SalesOrder/Items/Details/Composition" that would alert the user to changes made to the composition of items on the list, regardless of whether the items were currently within the focus of the user interface.

Figure 3:
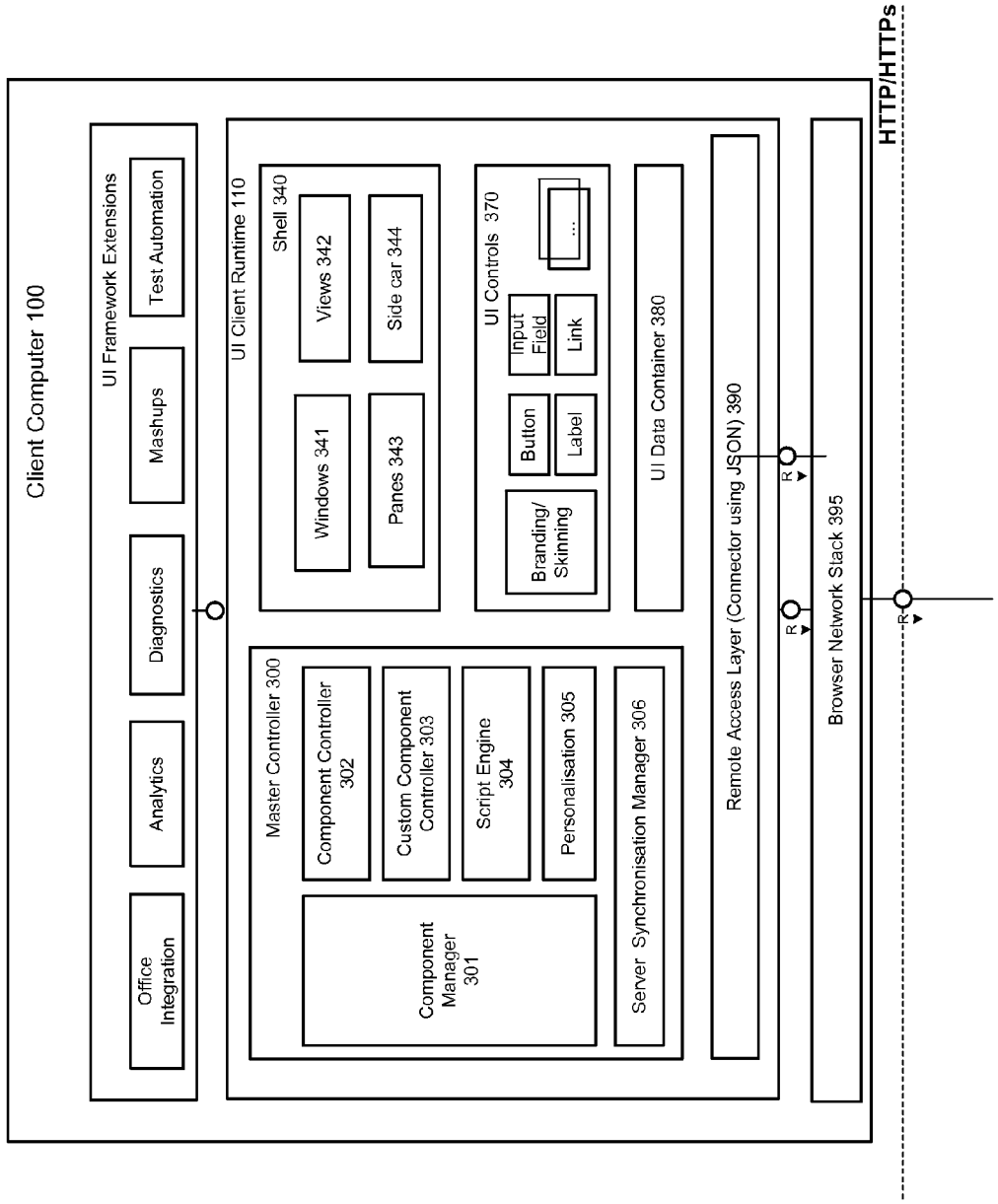
FIG. 3 is a block diagram of a client computer, including a client runtime that is capable of generating a UI for interacting with an application running on a server computer.

FIG. 3 is a block diagram of a client computer 100, including a client runtime 110 that is capable of generating a UI for executing an application 170 running on a server 150 in a client-server architecture. As shown in FIG. 3, the client runtime 110 includes a master controller 300, a shell 340, one or more UI controls 370, a UI data container 380, and a communications interface capable of establishing communication with a server runtime 160 on the server 150. In one implementation, the communications interface includes a JSON connector 390 and a browser stack 395. The master controller 300 includes a component manager 301, one or more component controllers 302 or custom component controllers 303, and a server synchronization manager 306. The master controller 300 may also include a scripting engine 304 and a personalization engine 305. The component manager 301 instantiates component objects 201 (see, FIG. 2) that make up the UI for the client runtime 110, and triggers the initialization of component objects 201 with data that is obtained from a data source such as backend application 170 running on server 150. The component objects 201 can be constructed from standardized UI controls 370, which can be obtained from a standard object repository 450 (see, FIG. 4) that is located on server 150. All component objects 201 in the client runtime 110 can be composed from the standard UI controls 370 or from other component objects 201. The top-level component object in the client runtime 110 can render a shell 340, which can consist of various windows 341, component object views 342 (i.e., views 203 of component objects 201), panes 343 and side cars 344 for personalization and help.

When the component manager 301 instantiates a component object, it also instantiates a controller 302 or 303 for the component object (i.e., a controller 204 for each component object 201 as shown in FIG. 2). The component manager 301 instantiates a standard component controller 302 for each UI control 370, and a custom component controller 303 for each composite component object (e.g., each component object that consists of two or more UI controls 370 or other UI component objects). As explained above in reference to FIG. 2, each component controller 302 or 303 binds the data fields of its component object to a data source (e.g., application 170) through an event handler 205 according to a data model 202. If data is bound to a component object 201 through a script, controllers 302 or 303 can trigger script engine 304 to execute that script. Each controller 302 or 303 can also trigger a refresh request and roundtrip data exchange with the server runtime 160 upon detecting a change to the data that is bound to its component object. These refresh requests and data exchanges are managed by a synchronization manager 306. The synchronization manager 306 identifies any data changes in a component object in the client runtime 110, and sends a refresh request to the server runtime 160 to reflect that data change in the corresponding server side component object.

Figure 4:
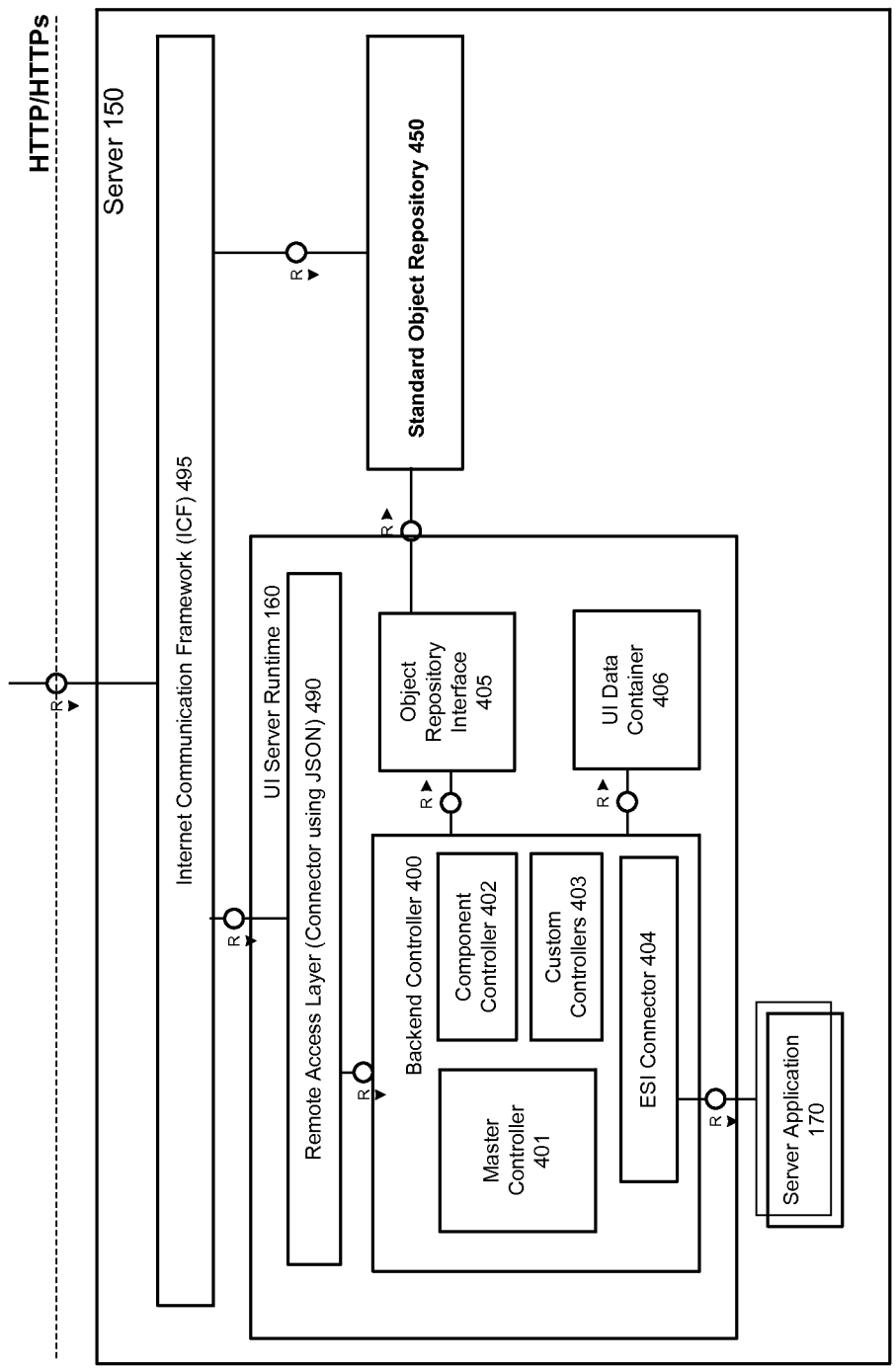
FIG. 4 is a block diagram of a server computer, including a server runtime that interfaces a client runtime running on a client computer with a data source running on the server.

FIG. 4 is a block diagram of a server 150, including a server runtime 160 that interfaces a client runtime 110 running on a client computer 100 with a data source such as an application 170 running on the server 150. The server runtime 160 includes a backend controller 400, an object repository interface 405, and a communications interface that is capable of connecting the server runtime 160 with a client runtime 110 on the computer 100. In one implementation, the communications interface includes an Internet Communications Framework 495 and a JSON connector 490. The backend controller 400 includes a master controller 401, one or more component controllers 402 or custom controllers 403, and a connector 404 to the application 170 running on the server 150. The object repository interface 405 connects the server runtime 160 with a standard object repository 450. The standard object repository 450 contains standardized UI component objects and controls, including standard data models that bind the data in the component objects and controls to a data source on server 150 such as application 170.

When a client runtime 110 is initialized on client computer 100, the client runtime 110 requests one or more UI component objects (which may be controls) from the server runtime 160, receives and instantiates the one or more UI component objects on the client computer 100, and requests initialization of the one or more component objects through the server runtime 160. When the server runtime 160 receives a request for a UI component object from the client runtime 110, it directs the request to the master controller 401. The master controller 401 retrieves the component object and its data model from the standard object repository 450, sends the component object and its data model to the client runtime 110. The master controller 401 also creates, within the service runtime 160, a component controller 402 or custom controller 403 and a data container 406 for the component object. The data container 406 stores data for the component object in a data structure defined by the component object's data model.

When the server runtime 160 receives the request to initialize the component object from the client runtime 110, it again directs the request to the master controller 401. The master controller 401 sends the request to the controller 402 or 403 of the component object. The controller 402 or 403 retrieves the initialization data from a data source on server 150 such as application 170, stores the data in the data container 406 for the component object, and sends the data to the synchronization manager 306 within the client runtime 110. The synchronization manager 306 in turn sends the data to the controller 302 or 303 of the client side component object, which writes the data to the client side data container 380 in the client runtime 110.

Subsequently, whenever the synchronization manager 306 on the client runtime 110 requests a refresh or roundtrip data exchange for a client side component object, the server side controller 402 or 403 for that component object receives and processes the request. For example, when data in a client side component object 201 is changed in the client runtime 110 (e.g., via user interaction), an event handler 205 in the controller 204 of the client side component object 201 sends the changed data to the synchronization manager 306 in the client runtime 110. The synchronization manager 306 asynchronously collects and sends the changed data to the master controller 401 in the service runtime 160. The master controller 401 sends the changed data to the controller 402 or 403 for the corresponding component object in the server runtime 160. The controller 402 or 403 receives the changed data, updates its data container 406, and performs any other actions indicated by the controller's event handler. Such actions may include sending the data to the application 170, calling a function in the application 170, or querying the application 170. In addition, controller 402 or 403 receives data from the application 170, updates the data container 406 for the component object, and sends the updated data to master controller 401 in the service runtime 160. Master controller 401 sends a message to the synchronization manager 306 in the client runtime 110 that includes the updated data. The synchronization manager 306 in turn sends the updated data to the controller 302 or 303 for the client side component object. The controller 302 or 304 then writes the updated data to the client side data container 380 for the component object to complete the roundtrip data exchange for the refresh request.

Figure 5:
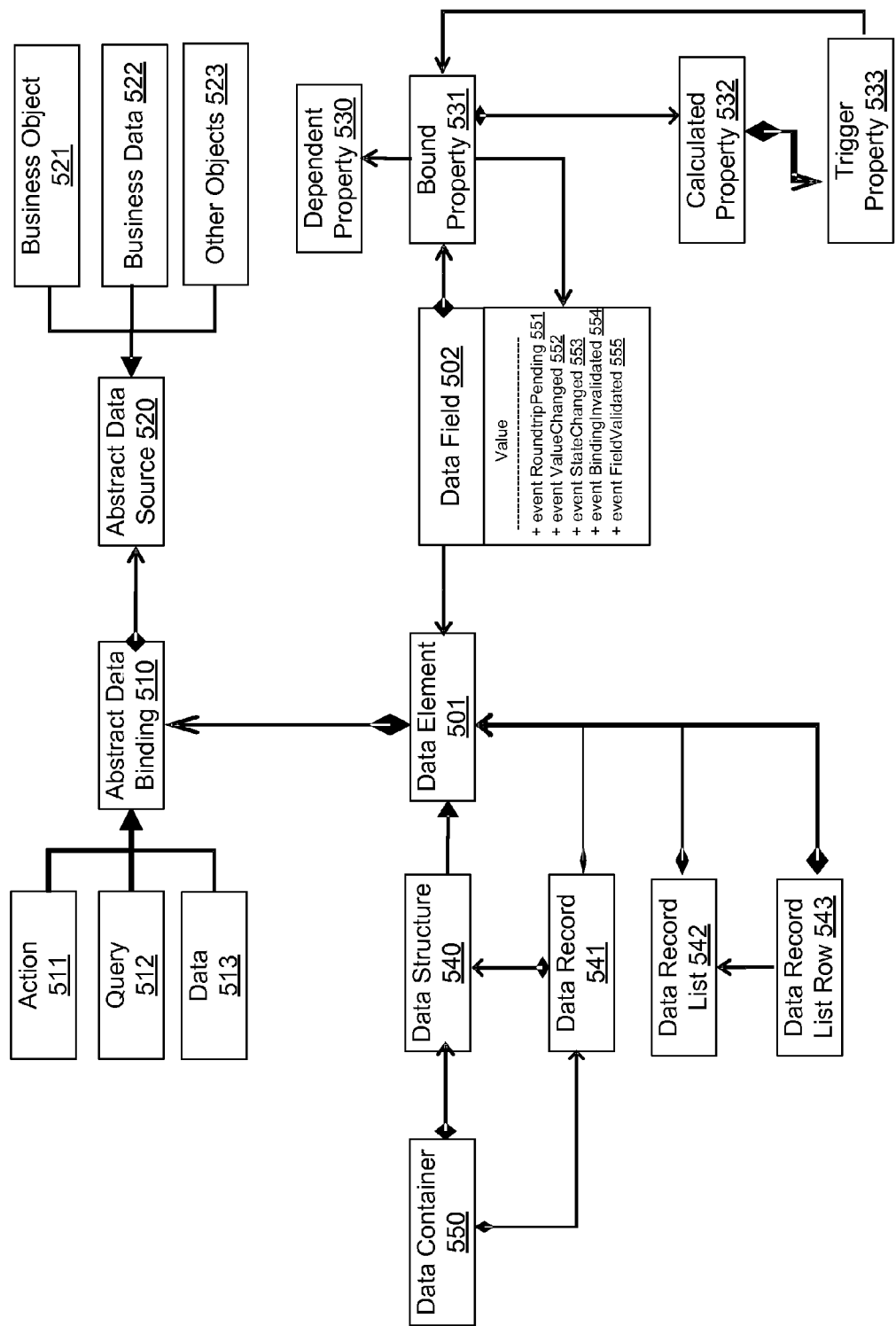
FIG. 5 is a schematic illustration of a class diagram showing the abstracted data model of a component object in the client runtime.

FIG. 5 is a schematic illustration of a class diagram showing the abstracted data model of a component object in the client runtime. The data model 202 defines the attributes for a data element 501 within a UI component object 201. For example, the data model 202 defines the binding 510 between the data element 501 and a data source 520. The data source 520 can be a backend application or business object 521 running on a remote server (e.g. application 170), an object or function within such an application 522, or another component object 523 in the client runtime 110. The binding 510 between the data element 501 and the data source 520 expresses a particular path to the data source 520. The path can be a call to particular function 511 within the data source 520, a query 512 of the data source 520, or a particular data object 513 or data element within the data source 520. Two-way data exchange can occur between the data element 501 and the data source 520 through these paths or data bindings 510.

As further shown in FIG. 5, each data element 501 can be part of an overall data structure 540 in the data model 202 of the component object 201. The client runtime 110 and server runtime 160 can access this data model 202 and data structure 540 through their respective data containers 550. For example, client runtime 110 can access the data model 202 of a component object 201 through its data container 380 as shown in FIG. 3, while server runtime 160 can access the data model 202 through its server side data container 406 shown in FIG. 4. The overall data structure 540 of the component object 201 allows individual data elements 501 to be organized as data records 541, lists 542 or list rows 543.

As also shown in FIG. 5, each data element 501 includes a data field 502 that can hold the value of the data element. The value of the data field 502 can depend on or be bound to additional information or sources of data as indicated in a bound property field 531. For example, the value of the data field 502 can depend on the value of data in another data element as indicated in a dependent property field 530. In addition, the value of the data field 502 can depend on one or more calculations that are indicated in a calculated property field 532. The calculated property field 532 defines the calculations that are needed to compute the value of the data field 502 from the information available from the bound data sources 520 and/or from any other data elements on which the value depends (e.g., as indicated in the dependent property field 530). When the value of the data field 502 in a component object 201 is bound through a calculation 532 or depends on data from another data element in another component object, one or more event triggers 533 can alert the client runtime 110 or service runtime 160 when the value of the data field 502 needs to be recomputed. For example, if the value of the data field 502 is the sum of the values from two or more independent data fields, a trigger 533 can alert the client runtime 110 or service runtime 160 to recompute the value of the data field 502 when the value of at least one of the independent data fields changes.

The calculated property field can be used to perform trivial calculations on the client computer 100 rather than on the server computer 150 to preserve bandwidth between the client and server computers. For example, the value of the data field 502 can be the age of a customer, and can depend on both the current date and the birthday of the customer. Whenever information regarding the customer's birthday or the current date is changed, the customer's age can be recalculated in the client runtime 110 by executing a script. The recalculated age and the changed birthday or current date information can then be sent to the corresponding component object in the server runtime 160. In this way, only a single data exchange between the client and server component objects is required. By contrast, were the age calculated in the server runtime 160, the updated customer birthday or current date would have to be sent from the client runtime 110 to the server runtime 160, the customer age calculated in the server runtime 160, and the updated customer age sent back to the client runtime 110, thus requiring two data exchanges between the client and server computers.

Finally, the data field 502 can also included a plurality of indicators 551-555 that contain information regarding the status of the data in data field 502. In particular, a round-trip pending indicator 551 can be set to indicate when the value stored in data field 502 in a component object 201 in the client runtime 110 has changed, and that change is being propagated to the data field of a corresponding component object 201 in the server runtime 160. A value change indicator 552 can be set to signal a change in the value stored in data field 502 to the synchronization manger 306 in the client runtime 110 shown in FIG. 3 or to the master controller 401 in the server runtime 160 shown in FIG. 4. A state changed indicator 553 can be set to signal when the state of the data value in the data field 502 has changed (e.g., from valid to invalid or from fresh to stale). A binding invalidated indicator 554 can be set to indicate when the abstract binding 510 of the data element 501 to the data source 520 is valid. For example, the binding invalidated indicator 554 can be set to invalid when the data source 520 (e.g., application 170) crashes. This indicator can be checked to insure that only valid data connected to a valid and up-to-date data source is displayed and used in the client side 110 UI. Finally, a field validated indicator 555 can be set to indicate when the value in the data field 502 is valid.

The methods and apparatus described herein may be implemented in digital electronic circuitry, or in computer hardware, firmware, software, or in combinations of them. They may be implemented as a computer program product, i.e., as a computer program tangibly embodied in a non-transitory machine-readable storage device for execution by, or to control the operation of, a processor, a computer, or multiple computers. Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). The method steps may be performed in the order shown or in alternative orders.

A computer program, such as the computer program(s) described above, can be written in any form of programming language, including compiled or interpreted languages, and can be deployed in any form, including as a stand-alone program or as a module, component, subroutine, plug-in or other unit suitable for use in a computing environment. A computer program can be deployed to be executed on one computer or on multiple computers at one site or distributed across multiple sites and interconnected by a communications network. Processors suitable for the execution of a computer program include, by way of example, both general and special purpose microprocessors, and any one or more processors of any kind of digital computer, including digital signal processors. Generally, a processor will receive instructions and data from a read-only memory or a random access memory or both.

Elements of a computer may include at least one processor for executing instructions and one or more memory devices for storing instructions and data. Generally, a computer may also include, or be operatively coupled to receive data from and/or transfer data to one or more mass storage devices for storing data, e.g., magnetic, magneto-optical disks, or optical disks. Machine readable media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the methods and apparatus may be implemented on a computer having a display device, e.g., a cathode ray tube (CRT) or liquid crystal display (LCD) monitor, for displaying information to the user and a keyboard and a pointing device, e.g., a mouse, trackball or touch pad, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The methods and apparatus described may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system, comprising:
a server-computer configured to run different server applications, the different server applications having diverse data models and logics; and
a user interface (UI) component object having a declarative interface for binding to the different server applications having diverse data models and logics running on the server-computer,
wherein the UI component object is configured for common instantiation in a server-computer runtime and in a client-computer runtime on a client computer,
wherein the UI component object has a universal data structure abstracted from the different data models and logics of the different server applications,
wherein the universal data structure includes:
a data model for representing data used by the UI component object;
a view model for graphically presenting the data used by the UI component object; and
a controller for manipulating the data used by the UI component object, the controller including an event handler configured to respond to events generated within a graphical user interface on the client computer,
wherein the server-computer is configured to write, interpret, and translate data of the different server applications having diverse data models and logics to the universal data structure in the UI component object, and
wherein the event handler is configured to respond to an event within the graphical user interface by calling a local script to calculate a value of a data element within the component object.

2. The system of claim 1, wherein the event handler binds data used by the component object to a data source.

3. The system of claim 2, wherein the component object is located on a client computer and the data source is remotely located on a server computer.

4. The system of claim 2, wherein the component object is located on a client computer and the data source is a second component object located on the same client computer.

5. The system of claim 2, wherein the data model includes a flag that indicates when the data used by the component object is validly bound to the data source.

6. The system of claim 1, wherein the data model includes a flag that indicates when a value of a data element within the component object has changed.

7. The system of claim 1, wherein the component object is instantiated on a client computer and is configured to communicate with a corresponding component object instantiated on a server computer.

8. The system of claim 7, wherein the client instantiated component object and the server instantiated component object exchange data, and the data exchanged comprises only data that needs to be exchanged to maintain the current state of a user interface in the client computer.

9. A system comprising:
a client computer; and
a graphical user interface configured to host, in client-computer runtime, an instantiation of a user interface (UI) component object bound to a first server application running on a server-computer and configured for common instantiation in a server-computer runtime,
wherein the UI component object has a declarative interface for binding to different server applications having diverse data models and logics running on the server-computer,
wherein the UI component object has a universal data structure abstracted from the diverse data models and logics of the different server applications available on the server-computer,
wherein the universal data structure includes:
a data model for representing application data used by the UI component object;
a view model for graphically presenting the application data used by the UI component object; and
a controller for manipulating the application data used by the UI component object, the controller including an event handler configured to respond to events generated within the graphical user interface,
wherein the UI component object instantiation on the graphical user interface is bound to the first server application running on the server-computer via communication links to a counterpart UI component object instantiation on the server-computer, and
wherein the event handler is configured to respond to an event within the graphical user interface by calling a local script to calculate a value of a data element within the component object.

10. The system of claim 9, wherein the component object event handler binds data used by the component object to a data source.

11. The system of claim 10, wherein the component object is located on a client computer and the data source is remotely located on a server computer.

12. The system of claim 10, wherein the component object is located on a client computer and the data source is a second component object located on the same client computer.

13. The system of claim 10, wherein the component object data model includes a flag that indicates when the data used by the component object is validly bound to the data source.

14. The system of claim 9, wherein the component object data model includes a flag that indicates when a value of a data element within the component object has changed.

15. The system of claim 9, wherein the component object is instantiated on a client computer and is configured to communicate with a corresponding component object instantiated on a server computer.

16. The system of claim 15, wherein the client instantiated component object and the server instantiated component object exchange data, and the data exchanged comprises only data that needs to be exchanged to maintain the current state of a user interface in the client computer.

* * * * *